(12) United States Patent
Cleary (10) Patent No.: US 9,817,531 B2
(45) Date of Patent: Nov. 14, 2017

(54) INTERLEAVED SCANNING FOR CAPACITIVE TOUCH SENSORS

(71) Applicant: Atmel Corporation, San Jose, CA (US)

(72) Inventor: Feargal Cleary, Dunshaughlin (IE)

(73) Assignee: Atmel Corporation, San Jose, CA (US)

(*) Notice: Subject to any disclaimer, the term of this patent is extended or adjusted under 35 U.S.C. 154(b) by 73 days.

(21) Appl. No.: 14/882,170

(22) Filed: Oct. 13, 2015

(65) Prior Publication Data
US 2017/0102799 A1     Apr. 13, 2017

(51) Int. Cl.
*G06F 3/044*     (2006.01)
*G06F 3/041*     (2006.01)

(52) U.S. Cl.
CPC ............ *G06F 3/044* (2013.01); *G06F 3/0416* (2013.01)

(58) Field of Classification Search
CPC ................................ G06F 3/044; G06F 3/041
See application file for complete search history.

(56) References Cited

U.S. PATENT DOCUMENTS

2012/0050216 A1* 3/2012 Kremin ................... G06F 3/044
345/174

* cited by examiner

*Primary Examiner* — Kevin M Nguyen
(74) *Attorney, Agent, or Firm* — Fish & Richardson P.C.

(57) ABSTRACT

A touch sensing circuit includes: a plurality of sensor channels; a controller coupled to the plurality of sensor channels, the controller configured to: map the sensor channels to sensor nodes, the sensor nodes forming a plurality of interleaved lumped sensors, where at least two of the interleaved lumped sensors include a common sensor node; scan, during a scan period, the interleaved lumped sensors to detect one or more touch inputs; and responsive to detecting one or more touch inputs, determining a location of at least one touch input.

20 Claims, 6 Drawing Sheets

INTERLEAVED SCANNING FOR CAPACITIVE TOUCH SENSORS

TECHNICAL FIELD

The subject matter of this disclosure relates generally to capacitive touch sensing.

BACKGROUND

Human interfaces for devices and machines can include capacitive touch sensors that allow a user to provide input to control various functions of the device or machine. The capacitive touch sensors are scanned periodically to detect touch input. Power consumption by the device or machine is impacted by the number of active sensor nodes that are scanned.

SUMMARY

In an embodiment, a touch sensing circuit includes: a plurality of sensor channels; a controller coupled to the plurality of sensor channels, the controller configured to: map the sensor channels to sensor nodes, the sensor nodes forming a plurality of interleaved lumped sensors, where at least two of the interleaved lumped sensors include a common sensor node; scan, during a scan period, the interleaved lumped sensors to detect one or more touch inputs; and responsive to detecting one or more touch inputs, determining a location of at least one touch input.

In an embodiment, a method of touch sensing comprises: mapping, by a controller of a touch sense circuit, sensor channels to sensor nodes, the sensor nodes forming a plurality of interleaved lumped sensors, where at least two of the interleaved lumped sensors include a common sensor node; scanning, during a scan period, the interleaved lumped sensors to detect one or more touch inputs; and responsive to detecting one or more touch inputs, determining a location of at least one touch input.

In an embodiment, a touch sensing system comprises: sensor nodes; a microcontroller; a controller coupled to the microcontroller and the sensor nodes, the controller configured to: map the sensor channels to the sensor nodes, the sensor nodes forming a plurality of interleaved lumped sensors, where at least two of the interleaved lumped sensors include a common sensor node; scan, during a scan period, the interleaved lumped sensors to detect one or more touch inputs; responsive to detecting one or more touch inputs, determining a location of at least one touch input; and reporting the location to the microcontroller.

DETAILED DESCRIPTION

Capacitive touch sensors may be implemented using one of the following example approaches: self-capacitance and mutual capacitance. A self-capacitance touch sensor node is formed by a single electrode, the capacitance of which is measured with respect to the circuit's direct current (DC) ground. Touch detection is achieved by a change in capacitance (touch delta) of the sensor node when touched. Each mutual capacitance touch sensor node is formed by a drive (X) electrode and a sense (Y) electrode. Capacitance between the two electrodes is measured and touch detection is again achieved by a characteristic change in the measured capacitance. In both approaches, capacitance of each individual sensor node is measured independently to implement touch detection.

In an example, the capacitance is measured for each of the sensor nodes in either a sequential order or a hierarchical order to reduce the overall scan time. For sequential order systems, sensor node capacitances are measured in a fixed order and compared individually to the previous measurements. A sequence of "n" number of measurements is implemented to detect the presence of a touch input on any sensor node. For relatively large numbers of sensor nodes, collecting measurements sequentially can be a time consuming process, which can result is an unacceptable latency in touch detection and/or increased power consumption due to the proportion of time the measurement system spends actively scanning the sensor nodes for touch input.

Pursuant to one example for hierarchical order systems, however, sensor nodes are grouped into lumped sensors, where multiple drive electrodes are electrically coupled or connected together and multiple and sense electrodes (mutual capacitance) or self-capacitance electrodes (self-capacitance) are electrically coupled or connected together to form a single complex capacitance. For example, if each lump sensor is configured to include "m" number of sensor nodes, then "n" sensor nodes are grouped into n/m lumped sensors as follows: Lump sensor 0=sensor nodes 0 to (m−1), Lump sensor 1=sensor nodes m to (2m−1), . . . Lump sensor (n/m)=sensor nodes (n−m−1) to (n−1).

In accordance with an example, a periodic measurement is carried out on the lumped sensors. When one of the lump sensors detects a touch input, then those m sensor nodes contained in the lump sensor are measured individually to determine which sensor node is touched. In the untouched state, a total of (n/m) measurements is required to determine that there is no touch input present. When a touch input is present, the individual sensor node that is touched may be determined with a total of (n/m)+m measurements. For example, assuming that Lump sensor 2 is touched, then the constituent keys of lump sensor 2 are measured: key m→key (m+1)→key (m+2) . . . →key (2m−1). If two touch inputs are present on different lumped sensors, the constituent keys of each of such lumped sensors are measured, thereby resulting in a total number of measurements equal to (n/m)+2m.

Example Interleaved Node Scanning

In an embodiment, as in the hierarchical node scanning method, the individual sensor nodes are grouped into lumped sensor so that a preliminary touch detection can be achieved without scanning all individual sensor nodes.

However, with the interleaved node scanning method, it is not necessary to measure the individual sensor nodes grouped in the lumped sensors. The presence and location of one or more touch inputs may be determined using only the measurements of the lumped sensors. To implement interleaved node scanning, the sensor nodes are grouped into lumped sensors. Different grouping schemes may be used, depending on the application requirements. In an embodiment, touch keys in a user interface (UI) may be grouped into lumped sensors such that capacitive measurement on lumped sensors alone allow unique detection for any touch key.

In one example configuration, each lumped sensor includes half of the touch keys, such that "n" lumped sensors are sufficient for touch detection on (2n−1) keys. Each key is a member of one or more lump sensors such that any individual key press is uniquely indicated by touch detection on one or more lumped sensors. Multiple touch contacts may be detected by an increased touch delta on a lumped sensor, which includes touch input on more than one of its constituent keys. Table I below illustrates an example touch key grouping with touch detection on 15 keys using 4 lumped sensors.

TABLE I

Example: Touch detection on 15 keys using 4 lumped sensors
4 Lumped Sensors

| Keys | Lumped Sensors (bit field) | Lump 3 | Lump 2 | Lump 1 | Lump 0 |
|---|---|---|---|---|---|
| 0  | 0001 | 0 | 0 | 0 | 1 |
| 1  | 0010 | 0 | 0 | 1 | 0 |
| 2  | 0011 | 0 | 0 | 1 | 1 |
| 3  | 0100 | 0 | 1 | 0 | 0 |
| 4  | 0101 | 0 | 1 | 0 | 1 |
| 5  | 0110 | 0 | 1 | 1 | 0 |
| 6  | 0111 | 0 | 1 | 1 | 1 |
| 7  | 1000 | 1 | 0 | 0 | 0 |
| 8  | 1001 | 1 | 0 | 0 | 1 |
| 9  | 1010 | 1 | 0 | 1 | 0 |
| 10 | 1011 | 1 | 0 | 1 | 1 |
| 11 | 1100 | 1 | 1 | 0 | 0 |
| 12 | 1101 | 1 | 1 | 0 | 1 |
| 13 | 1110 | 1 | 1 | 1 | 0 |
| 14 | 1111 | 1 | 1 | 1 | 1 |

As illustrated in Table I: Lump 0 combines keys 0, 2, 4, 6, 8, 10, 12, 14; Lump 1 combines keys 1, 2, 5, 6, 9, 10, 13, 14; Lump 2 combines keys 3, 4, 5, 6, 11, 12, 13, 14; and Lump 3 combines keys 7, 8, 9, 10, 11, 12, 13, 14.

For a single touch detection, the node grouping logic is reversed. For example, if only Lump 0 is touched, then key 0 is touched. If Lump 0 and Lump 1 are touched, then key 2 is touched. If Lump 0 and Lump 2 are touched, then key 4 is touched. If Lumps 0, 1 and 2 are touched, then key 6 is touched. For multitouch detection, where multiple keys may be simultaneously touched, a further check can resolve which key or combination of keys is in detect. The relative size of capacitance change (touch delta) on the lumped sensors can be used to reduce the possibilities for which key or combination of keys is in detect.

For example, if lumped sensors Lump 0, Lump 1 and Lump 3 are in detect, and Lump 3 has twice (or approximately twice) the touch delta of the other two Lumped sensors, then at least two touch inputs are present, both of which include Lump 3 (keys 7 to 14). Only one of each of the touch inputs includes Lumps 0 and 1, whereas none of the touch inputs includes Lump 2 (keys 8 and 9). If Lumps 0 and 1 show detection with similar touch delta, the detection may be due to one touch input on key 2 or two touch inputs on keys 0 and 1. This ambiguity may be resolved by measuring key 2 only; if key 2 is not touched, then keys 0 and 1 are touched. If all four lumped sensors show touch detect with similar touch delta, the detection may be one touch input on key 14, two touch inputs on keys (2, 11), three touch inputs on keys (2, 3, 7) or keys (0, 1, 11), or four touch inputs on keys (0,1,3,7). In this case key 14 is scanned. If key 14 is not in detect, keys 2 and 11 are scanned. The status of these 3 keys is sufficient to determine which of the possible options is correct.

The interleaved node scanning described above provides advantages over sequential order and hierarchical order node scanning. The three node scanning techniques described above can be applied to a UI application with 30 touch buttons including a sequential order scan, hierarchal order scan of 5 Lumped nodes of 6 keys each and an interleaved scan. For a single touch contact, the sequential scan requires 30 measurements, the hierarchal scan requires 11 measurements and the interleaved scan requires 5 measurements. For two touch contacts, the sequential scan requires 30 measurements, the hierarchal scan requires up to 17 measurements and the interleaved scan requires up to 6 measurements. For three touch contacts, the sequential scan requires 30 measurements, the hierarchical scan requires up to 23 measurements and the interleaved scan requires up to 7 measurements.

2D Touch Surfaces

Interleaved node scanning may be applied to two-dimensional (2D) touch surfaces to reduce the number of capacitive measurements required to resolve touch input presence and position(s). Sensor nodes are grouped into rows and columns, such that a 1D lumped sensor (e.g., a touch slider) is formed along each axis of the surface and may optionally include the entire touch surface area. In this way touch input location(s) on a surface comprising m×n sensor nodes may be determined with only m+n measurements. When single touch input is present, the vertical position is the location of the touch input on the vertical slider, the horizontal position is the location of the touch input on the horizontal slider. Multiple touch inputs may be detected along each slider, but as each X and Y position is calculated independently it may not be immediately determined which X position matches with which Y position. Additional measurements are required to finalize the touch input location either by detection (single node scan) or by re-interpolation (3-node scan), as described in reference to FIG. 6.

A comparison of scan methods was made for 2D touch surfaces based on an 8×8 grid of sensors measured using a sequential order scan, a hierarchal order scan with 8 lumped sensor nodes of 8 nodes each and an interleaved scan. For a single touch input, the sequential scan required 64 measurements, the hierarchical scan required 16 measurements and the interleaved scan required 16 measurements. For two touch inputs, the sequential scan required 64 measurements, the hierarchical scan required up to 24 measurements and the interleaved scan requires 17 measurements for low multi-touch resolution and up to 22 measurements for high multi-touch resolution. For three touch inputs, the sequential scan required 64 measurements, the hierarchical scan required up to 32 measurements and the interleaved scan required 18 measurements for low multi-touch resolution and up to 25 measurements for high multi-touch resolution.

Example Systems

Figure 1:
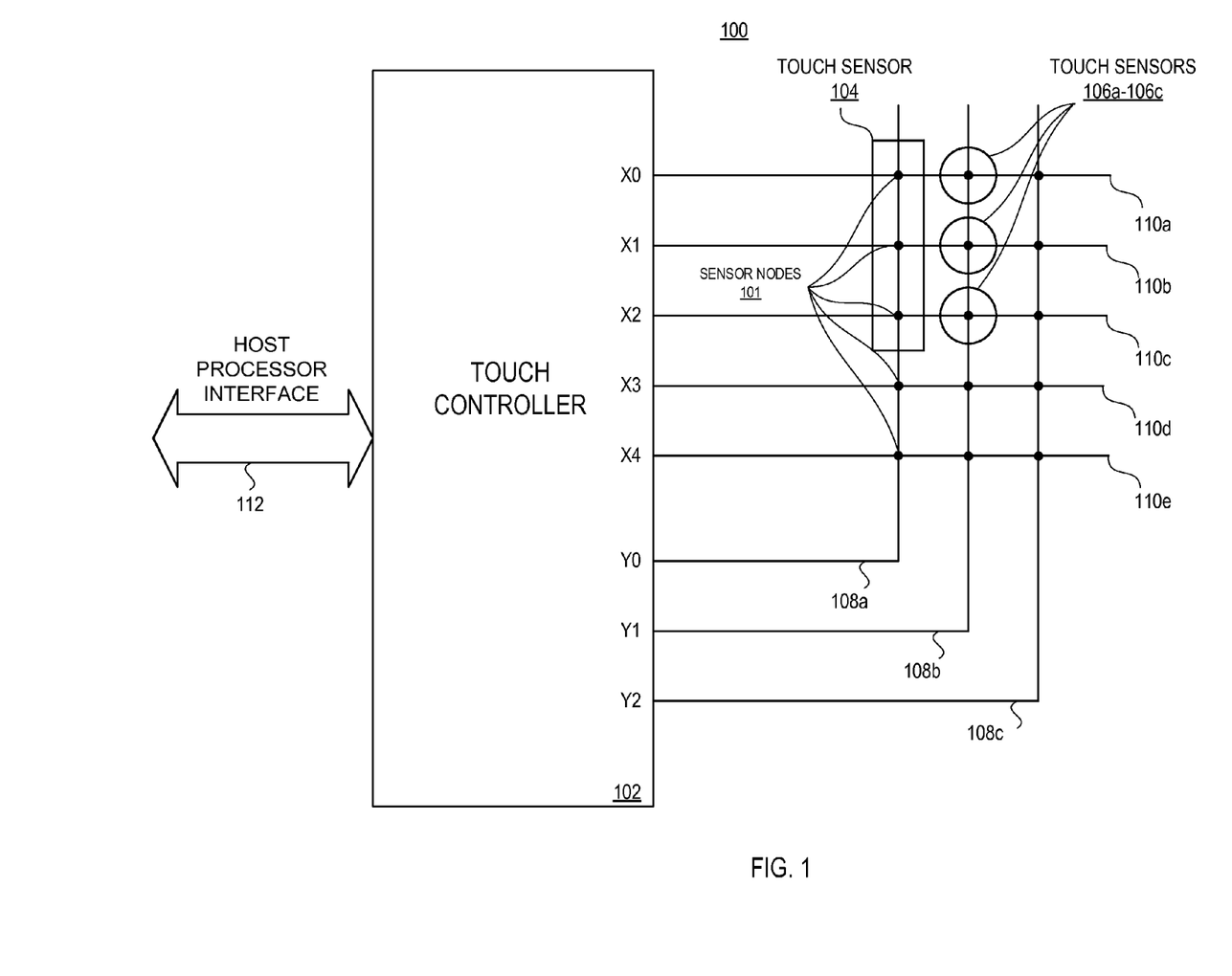
FIG. 1 illustrates an example capacitive touch system, according to an embodiment.

FIG. 1 illustrates an example capacitive touch system 100, according to an embodiment. In the embodiment shown, touch sensing system 100 includes touch controller 102 and capacitive touch sensors 104, 106a-106c. In the example embodiment, sensor 104 is a slider and sensors 106a-106c are touch keys. Other types of capacitive touch sensors are also applicable to the disclosed embodiments (e.g., a touch wheel). Touch sensors 104, 106 include one or more sensor nodes 101 located at the intersections of sense electrodes 108a-108c and drive electrodes 110a-110e. Sense electrodes 108a-108c are coupled to ports Y0-Y2 of touch controller 102. Drive electrodes 110a-110e are coupled to ports X0-X4 of touch controller 102. In this example embodiment, sensor nodes 101 are laid out in an N×N grid pattern, referred to as a "sensor grid," where "N" is a positive integer value greater than 1.

The example capacitive touch system 100 is configured for mutual capacitive sensing, where an object (e.g., finger, conductive stylus) alters the mutual coupling between sense electrodes 108a-108c and drive electrodes 110a-110e. Sensor 104 includes three sensor nodes 101. Sensors 106a-106c each include a single sensor node 101. Other sensor types may include more or fewer sensor nodes depending on the sensor size and shape. Each intersection or sensor node 101 is referred to as an "X-Y channel." In the example embodiment shown, touch sensor 104 (a slider) is mapped to channels (X0-Y0), (X1-Y0) and (X2-Y0), and touch sensors 106a-106c (3 buttons) are mapped to X-Y channels (X0-Y1), (X1-Y1) and (X2-Y1), respectively. If an object (e.g., finger or stylus) touches touch sensor 104 one of the 15 X-Y channels will measure a change in mutual capacitance (e.g., reduced mutual capacitance) at the corresponding sensor node. For example, if an object touches slider 104, one of the X-Y channels (X0-Y0), (X1-Y0), (X2-Y0) that is mapped to slider 104 will measure a change in mutual capacitance (touch delta). In an embodiment, a detection circuit in touch controller 102 is configured to determine a change in mutual capacitance due to the addition of an object (e.g., finger) capacitance, such as, for example, described in reference to FIGS. 2 and 3. In an embodiment, touch controller 102 is configured to scan the 15 sensor nodes 101 shown by scanning the X-Y channels mapped to the sensor nodes over a scan period (e.g., 25 ms).

The scan sequence can be performed by touch controller 102 periodically during a user active period when the user is interacting with the device or machine. The user active period can start when a touch input is detected and can end when no touch inputs are detected for a specified period of time (e.g., 10 seconds). A user-inactive period is defined to be the time period between two user active periods. During a user-inactive period, the device or machine can be powered down into a sleep or low power state. When a touch input is detected, the device or machine wakes up, a new user active period is started and touch controller 102 actively scans all 15 X-Y channels to detect a touch input. Based on the X-Y channel that detects a change in mutual capacitance at the sensor nodes, the location of the touch input in the sensor grid can be determined. In an embodiment, the scanning of sensor nodes 101 is performed at least in part by firmware executed by touch controller 102.

When a device or machine is sleeping and in a user-inactive mode all 15 X-Y channels are scanned periodically to detect touch input, which consumes power. For mobile devices with limited power sources (e.g., battery operated devices), it is desirable to reduce power consumption. Rather than measure every X-Y channel during a scan period, sensor nodes 101 can be "lumped" together and treated by touch controller 102 as a single lumped sensor.

In an embodiment, capacitive touch system 100 can be coupled to a microcontroller or other device through interface 112. Raw or processed touch detection data can be sent to a microcontroller (not shown) over interface 112. A host application running on a central processing unit (CPU) or peripheral of a microcontroller can process the sensor data using software/firmware, hardware or a combination of software/firmware and hardware. The sensor data can be made available to the host application through, for example, one or more Application Programming Interfaces (APIs). Data processing can include, for example, configuring individual sensor parameters (e.g., threshold and position hysteresis, position resolution), sensor acquisition parameters (e.g., filtering, automatic oversampling, gain settings, prescalers), sensor noise measurement and sensor self-calibration. Touch controller 102 can include registers (not shown) for storing data and commands that are received and transmitted over interface 112.

Figure 2:
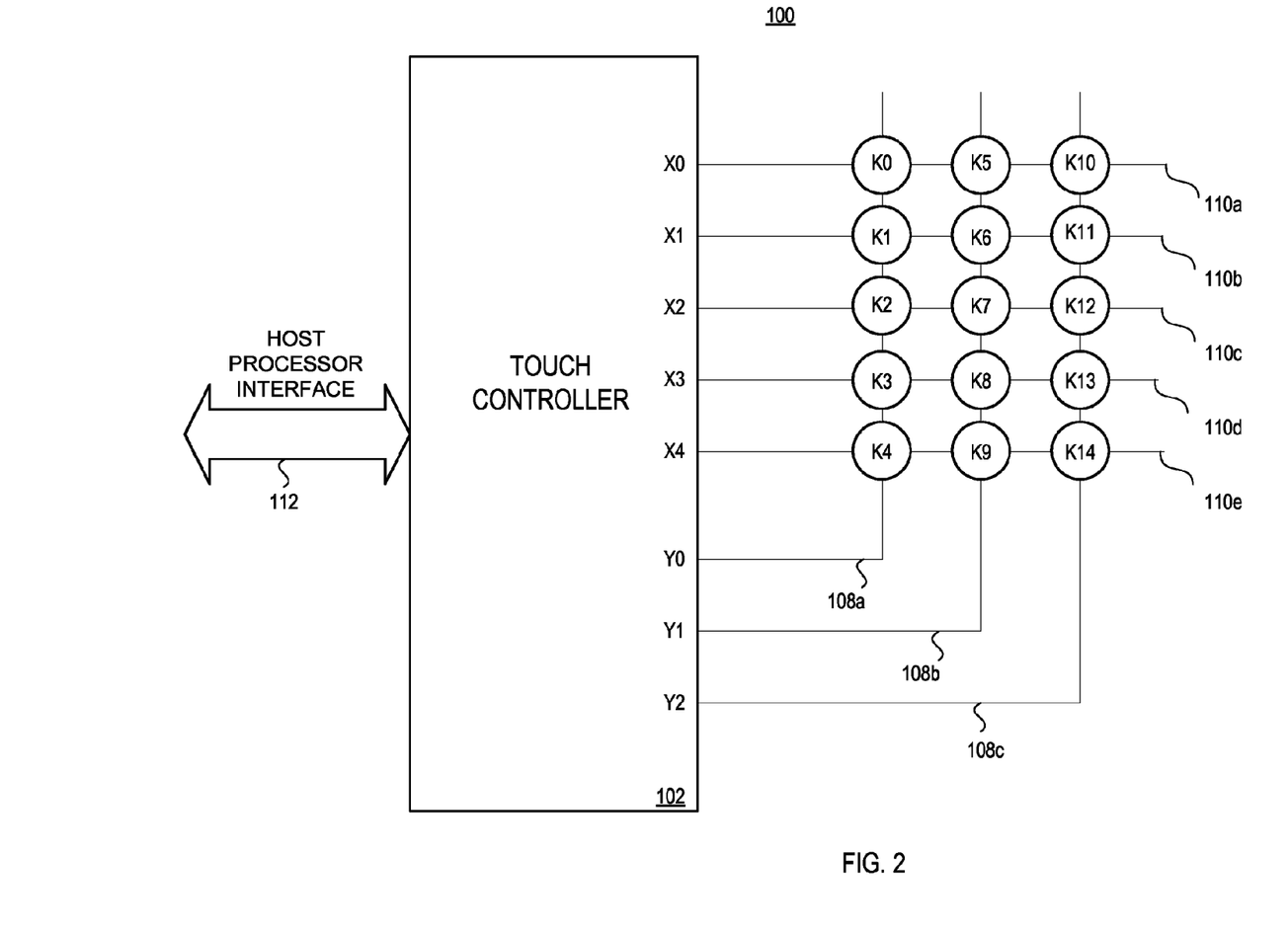
FIG. 2 illustrates example interleaved lumped sensors in a capacitive touch system, according to an embodiment.

FIG. 2 illustrates interleaved lumped sensors in a capacitive touch system, according to an embodiment. In some implementations, capacitive touch system 100 includes touch controller 102 and touch keys K0-K14. In this example embodiment, each of the touch keys is a sensor node 101, as described in reference to FIG. 1. An interleaved lumped sensor includes multiple sensor nodes that are combined to act as a single touch sensor. When multiple sensor nodes are lumped together and treated as a single touch sensor by touch controller 102, the time needed to perform a scan sequence is reduced. For battery powered applications using multiple touch buttons, a group of touch buttons can be lumped together to form a single interleaved lumped sensor and this interleaved lumped sensor alone can be scanned, thereby resulting in reduced power consumption. Upon touch input detection on the interleaved lumped sensor in most cases the location of the touch input can be determined without scanning the constituent sensor nodes of the interleaved lumped sensor, thus reducing the number of sensor nodes scanned/measured.

To illustrate an example embodiment using 7 interleaved lumped sensors L0-L6, we can assume that touch system 100 is currently in an inactive user state. For example, no touch input is detected for a period of time (e.g., 10 seconds). While in the user inactive state, each lumped sensor is scanned or measured periodically to detect touch input. For example, lumped sensor L0 is measured by touch controller 102, followed by lumped sensor L1, followed by lumped sensor L2, followed by lumped sensor L3 and so forth. The order here is only an example; lumped sensors L0-L6 can be measured in any specified order. In general, lumped sensors L0-L6 can be formed by shorting specific sense electrodes coupled to ports Y0-Y2 and drive electrodes coupled to ports X0-X4.

In this example embodiment, the lumped sensors L0-L6 are interleaved according to Table II below.

TABLE II

Example: Touch detection on 15 keys using 7 lumped sensors
7 Lumped Sensors

| Keys | Lumped Sensors (bit field) | L6 | L5 | L4 | L3 | L2 | L1 | L0 |
|---|---|---|---|---|---|---|---|---|
| K0 | 0001001 | 0 | 0 | 0 | 1 | 0 | 0 | 1 |
| K1 | 0010001 | 0 | 0 | 1 | 0 | 0 | 0 | 1 |
| K2 | 0100001 | 0 | 1 | 0 | 0 | 0 | 0 | 1 |
| K3 | 1000001 | 1 | 0 | 0 | 0 | 0 | 0 | 1 |
| K4 | 0000001 | 0 | 0 | 0 | 0 | 0 | 0 | 1 |

TABLE II-continued

Example: Touch detection on 15 keys using 7 lumped sensors
7 Lumped Sensors

| Keys | Lumped Sensors (bit field) | L6 | L5 | L4 | L3 | L2 | L1 | L0 |
|---|---|---|---|---|---|---|---|---|
| K5  | 0001010 | 0 | 0 | 0 | 1 | 0 | 1 | 0 |
| K6  | 0010010 | 0 | 0 | 1 | 0 | 0 | 1 | 0 |
| K7  | 0100010 | 0 | 1 | 0 | 0 | 0 | 1 | 0 |
| K8  | 1000010 | 1 | 0 | 0 | 0 | 0 | 1 | 0 |
| K9  | 0000010 | 0 | 0 | 0 | 0 | 0 | 1 | 0 |
| K10 | 0001000 | 0 | 0 | 0 | 1 | 0 | 0 | 0 |
| K11 | 0010100 | 0 | 0 | 1 | 0 | 1 | 0 | 0 |
| K12 | 0100100 | 0 | 1 | 0 | 0 | 1 | 0 | 0 |
| K13 | 1000100 | 1 | 0 | 0 | 0 | 1 | 0 | 0 |
| K14 | 0000100 | 0 | 0 | 0 | 0 | 1 | 0 | 0 |

As illustrated in Table II: Lump 0 combines keys K0, K1, K2, K3, K4; Lump 1 combines keys K5, K6, K7, K8, K9; Lump 2 combines keys K11, K12, K13, K14, K15; Lump 3 combines keys K0, K5, K10; Lump 4 combines keys K1, K6, K11; Lump 5 combines keys K2, K7, K12; and Lump 6 combines keys K3, K18, K13. Note that there is no need for an $8^{th}$ (X4) group, as these 3 keys are contained in L0, L1, L2 and can be identified by their absence from L3, L4, L5, L6.

For a single touch detection, if only Lump 0 is in detect, then key K4 is touched; if Lump 0 and Lump 1 are touched, then key K9 is touched; if Lump 0 and Lump 3 are touched, then key K0 is touched; if Lump 0 and Lump 4 are touched, then key K1; if Lump 2 and Lump 4 are touched, then key K11 is touched; and so forth. For multitouch detection, where multiple keys may be simultaneously touched, a further check can resolve which key or combination of keys is in detect. The relative size of capacitance change (touch delta) on the lumped sensors can be used to reduce the possibilities for which key or combination of keys is in detect.

For multitouch detection, where multiple keys may be simultaneously touched, a further check can resolve which key or combination of keys is in detect. The relative size of capacitance change (touch delta) on the lumped sensors can be used to reduce the possibilities for which key or combination of keys is in detect, as previous described in reference to Table I. If the lumped sensors in detect show detection with similar touch delta an ambiguity is created. This ambiguity may be resolved by measuring individual lumped sensors in a process of elimination.

Figure 3:
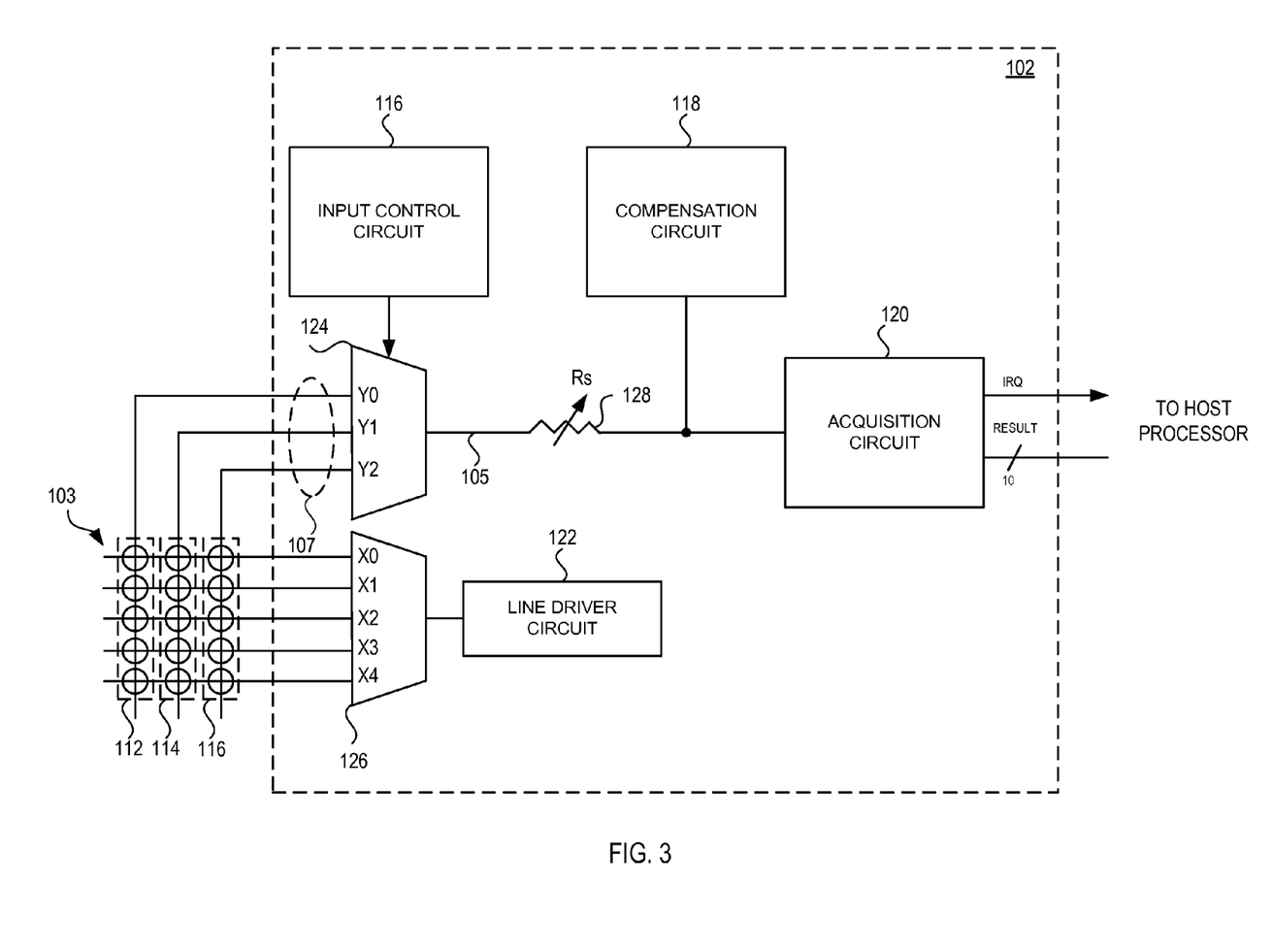
FIG. 3 illustrates an example touch controller circuit for scanning interleaved mutual capacitive lumped sensors, according to an embodiment.

FIG. 3 illustrates touch controller circuit 102 for measuring interleaved mutual capacitive touch sensors, according to an embodiment. In some implementations, touch controller 102 can include input control circuit 116, sensor channels 107, compensation circuit 118, acquisition circuit 120, line driver 122, selection circuit 124, selection circuit 126 and series resistor 128 (Rs).

In this mutual capacitance embodiment, selection circuit 124 is coupled to the sensor channels 107 and selection circuit 126 is coupled to line driver circuit 122. Line driver circuit 122 is configured to drive individual drive electrodes coupled to ports X0-X4 during a scan period using selection circuit 126. Selection circuit 126 is coupled to input control circuit 116, which is configured to select individual sensor channels 107 during a scan period. For example, to scan lumped sensor 112 selection circuit 126 shorts the drive electrodes coupled to ports X0-X4 and selection circuit 124 shorts sense channel Y0. Line driver circuit 122 provides drive voltages to the drive electrodes and, in an embodiment, can receive a selection signal (not shown) from input control circuit 116.

Acquisition circuit 120 is coupled to charge path 105 and measures the change in capacitance of a sensor node in sensor grid 103 due to touch input. In an embodiment, acquisition circuit 120 converts the measured sensor node capacitance into a digital value (e.g., 10 bit value). The count can be transferred over interface 112 (FIG. 1) to, for example, a host processor to be further processed by a hosted application. In an embodiment, an interrupt (IRQ) signal is also sent to the host processor over interface 112 to "wake up" the host processor to retrieve the count from, for example, a register (not shown) in touch controller 102.

In an embodiment, acquisition circuit 120 can include a switched capacitor circuit configured to convert sensor node capacitance to an equivalent resistor. A sigma-delta modulator circuit converts the current measured through the equivalent resistor into a bit stream, which is fed to a counter during the scan period. The counter value determines the "ON" or "OFF" status of the sensor node or lumped sensor. When touch input is received, the counter value increases and if it exceeds a reference or baseline level the sensor node has "ON" status.

Compensation circuit 118 is coupled to charge path 105 and compensates for noise. In an embodiment, compensation circuit 118 can be a capacitor network which is tuned to match sensor capacitance to provide a largest dynamic range of input signal, which improves noise tolerance.

Figure 4:
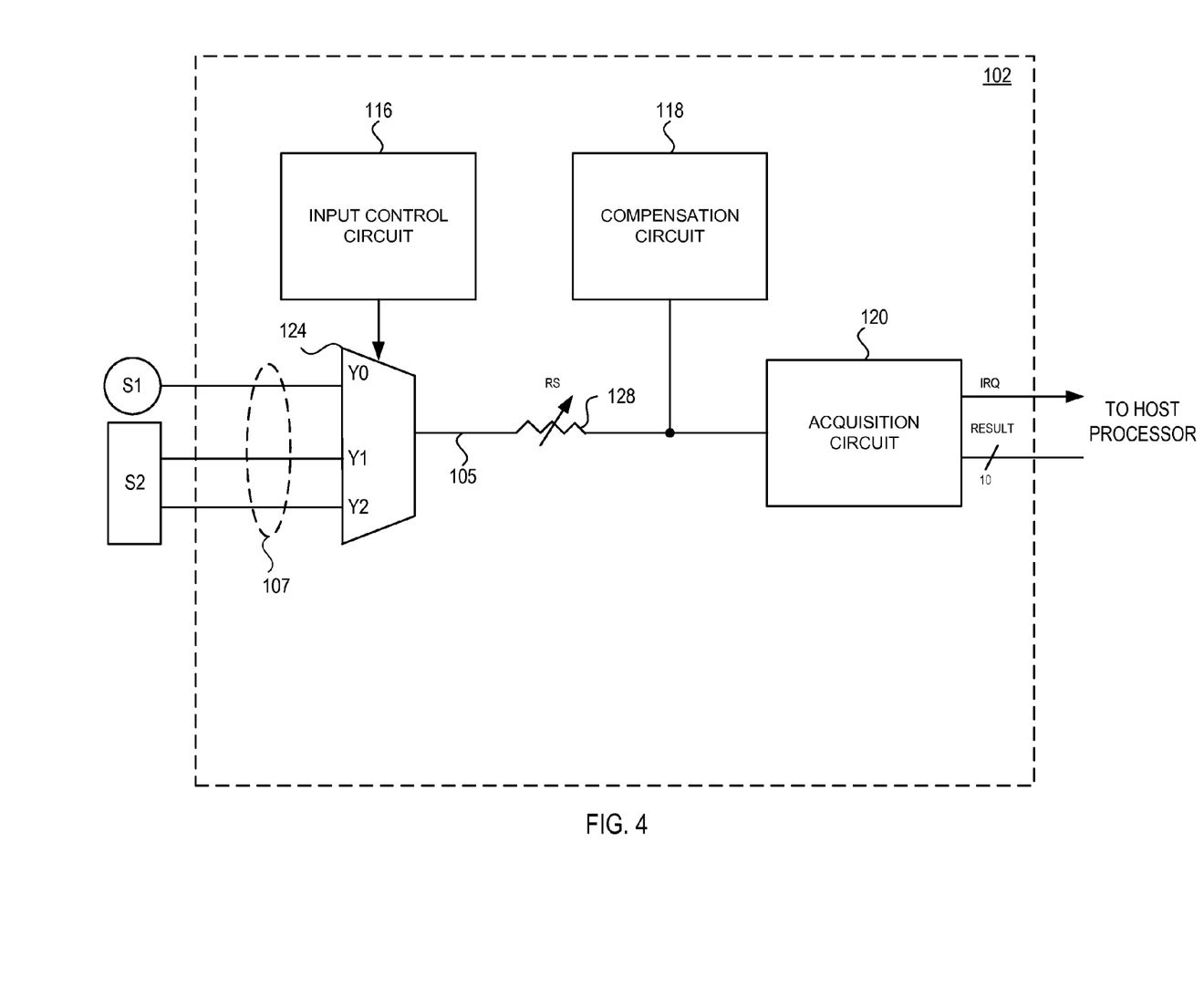
FIG. 4 illustrates an example touch controller circuit for scanning interleaved self-capacitive lumped sensors, according to an embodiment.

FIG. 4 illustrates a touch controller circuit 102 for measuring interleaved self-capacitive touch sensors, according to an embodiment. In this example embodiment, only sense electrodes (e.g., sense electrodes 108a-108c) are coupled to self capacitance sensors and are selected using the input control circuit 116. The drive electrodes (e.g., drive electrodes 110a-110e) remain unused and can be used for other general purpose input/output functionality. The other components of touch controller 102, including compensation circuit 118 and acquisition circuit 120 operate in a similar manner as described in reference to FIG. 3.

Example Processes

Figure 5:
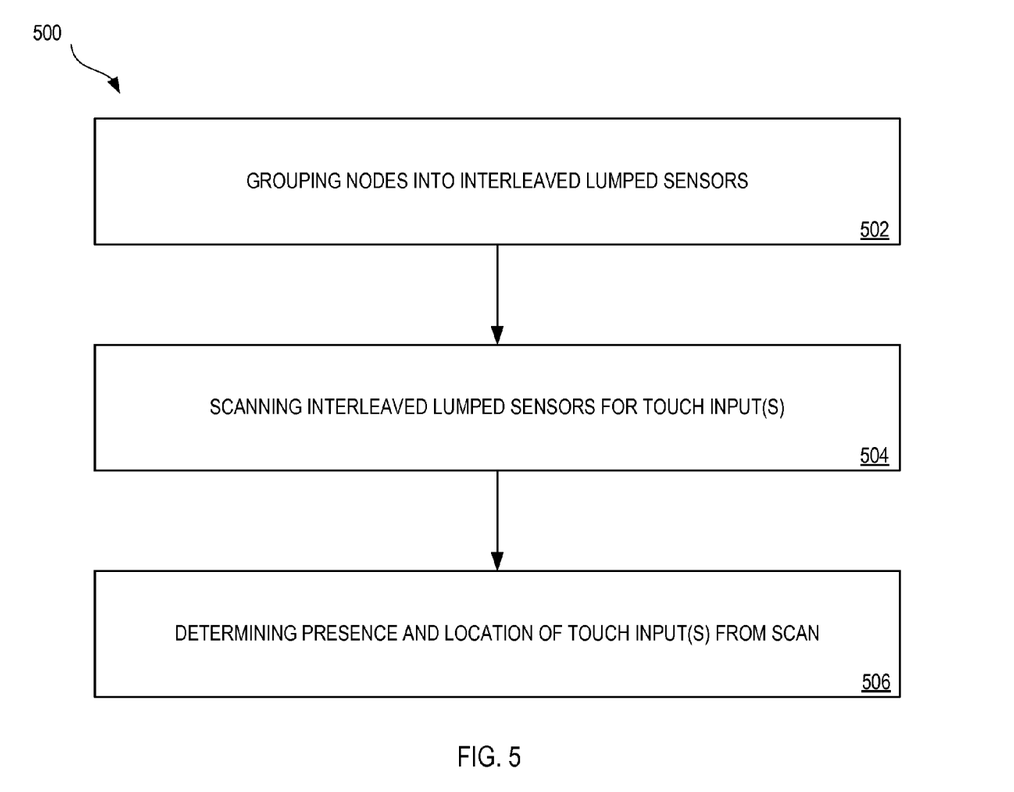
FIG. 5 is a flow diagram of an example process of interleaved node scanning of lumped sensors.

FIG. 5 is a flow diagram of an example process 500 for interleaved node scanning in a capacitive touch system, according to an embodiment. Process 500 can be implemented by, for example, touch system 100 shown in FIG. 1.

In an embodiment, process 500 can begin by grouping sensor nodes into interleaved lumped sensors (502). For example, for touch keys with one sensor node per key, a table can be generated similar to Table I or Table II to provide a mapping between sensor channels and sensor nodes, which can be used in interleaved node scanning. A touch controller coupled to the sensor nodes can determine which lumped sensors are in detect by comparing a bit field corresponding to the lumped sensors with the table that contains the mapping.

Process 500 can continue by scanning the interleaved lumped sensors for touch input(s) (504). For example, the touch controller can perform an interleaved scan on the interleaved lumped sensors.

Process 500 can continue by determining location(s) of touch input(s) from scan (506). For example, touch keys in detect can be determined by the mapping and/or individual node scans to resolve ambiguities, as described in reference to FIGS. 2 and 6.

Figure 6:
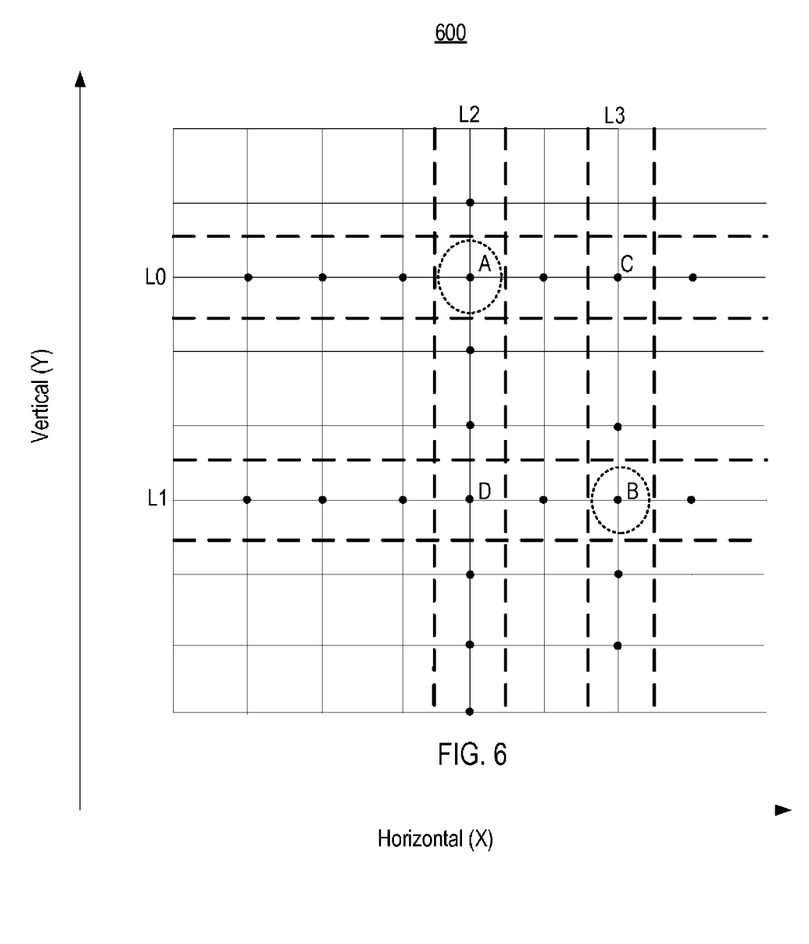
FIG. 6 illustrates an example interleaved node scanning on a 2D touch surface.

FIG. 6 illustrates interleaved node scanning on a 2D touch surface. As previously described, interleaved node scanning may be applied to 2D touch surfaces to reduce the number of capacitive measurements used to resolve touch input presence and locations. In the example, shown, sensor nodes are grouped into rows and columns, such that 1D lumped sensors L0, L1 (e.g., touch sliders) are formed along the horizontal axis of 2D touch surface 600 and 1D lumped sensors L2, L3 are formed along the vertical axis of 2D touch surface 600. The 1D lumped sensors are indicated in FIG. 6 as dashed lines. When single touch input is present at node A (indicated by the dashed oval), lumped sensors L0, L2 are in detect and the location of the single touch input is determined from the X (horizontal) and Y (vertical) coordinates of sensor node A. Similarly, when a single touch input is present at node B, lumped sensors L1, L3 are in detect and the location of the single touch input is determined from the horizontal and vertical coordinates of sensor node B. If, however, a multitouch input is present at sensor nodes A and B, there is a location ambiguity that needs to be resolved. For example, if nodes A, B are touched simultaneously all four lumped sensors L0, L1, L2 and L3 will be in detect and a location ambiguity arises. Simultaneous touches at nodes C and D cannot be differentiated from simultaneous touch inputs at nodes A and B, as both touch inputs result in lumped sensors L0-L3 being in detect. Multiple touch inputs may be detected along each lumped sensor, but as each X and Y position is calculated independently it may not be immediately determined which X position matches with which Y position. Additional measurements are required to finalize the touch input location by detection using a single sensor node scan.

The lumped sensor measurements indicate two touch positions: horizontally $X_a$ and $X_b$, vertically $Y_a$, $Y_b$, where the subscript "a" in $X_a$ means the X coordinate of node A and the subscript "b" in $Y_b$ means the Y coordinate of node b. In this case, the XY coordinates of these touch points may be $A(X_a, Y_a)$ and $B(X_b, Y_b)$ or $C(X_a, Y_b)$ and $D(X_b, Y_a)$. This location ambiguity may be resolved with a single measurement of any one of these four nodes. For example, if the $A(X_a, Y_a)$ node is in detect then the touch inputs are at $A(X_a, Y_a)$ and $B(X_b, Y_b)$. If the $(X_a, Y_a)$ node is not in detect then the touch inputs are at nodes $C(X_a, Y_b)$ and $D(X_b, Y_a)$. In general, n contacts with distinguishable horizontal and vertical positions may be resolved with (n−1) additional measurements.

If the lumped sensor measurements indicate two touch positions horizontally $A(X_a, X_b)$ but only one vertically $(Y_a)$, then there are two touch inputs present but they are vertically too close to each other to be distinguished by the vertical lumped sensor measurements. Depending on the required position accuracy, it will often be acceptable for the touch controller to report these two touch inputs as $A(X_a, Y_a)$ and $D(X_b, Y_a)$. If the application requires positional accuracy for multiple touch inputs which is higher granularity than the minimum slider distance, then 6 nodes must be measured for re-interpolation. If $X_{na}$ is the center node relating to $X_a$ position, $X_{nb}$ that relating to the $X_b$ position, $Y_{na}$ the center node relating to the reported $Y_a$ position, then 3 measurements per touch input are required for accurate position interpolation. To determine the touch input at the $X_a$ vertical position, nodes $(X_{na}, Y_{na}-1)$ $(X_{na}, Y_{na})$ $(X_{na}, Y_{na}+1)$ are measured. To determine touch input at the $X_b$ vertical position, nodes $(X_{nb}, Y_{na}-1)$ $(X_{nb}, Y_{na})$ $(X_{nb}, Y_{na}+1)$ are measured.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A touch sensing circuit comprising:
   a plurality of sensor channels;
   a controller coupled to the plurality of sensor channels, the controller configured to:
      map the sensor channels to sensor nodes, the sensor nodes forming a plurality of interleaved lumped sensors, where at least two of the interleaved lumped sensors include a common sensor node;
      scan, during a scan period, the interleaved lumped sensors to detect one or more touch inputs; and responsive to detecting one or more touch inputs, determining a location of at least one touch input.

2. The touch sensing circuit of claim 1, wherein the controller is further configured to:
   scan a sensor node in an interleaved lumped sensor to resolve a detection ambiguity between two or more interleaved lumped sensors that are touched.

3. The touch sensing circuit of claim 1, wherein the controller is further configured to:
   compare changes in capacitance measured on two or more interleaved lumped sensors to resolve a detection ambiguity between the two or more interleaved lumped sensors.

4. The touch sensing circuit of claim 1, wherein the controller is further configured to map the interleaved lumped sensors to rows and columns of a two-dimensional (2D) surface to thereby form a one-dimensional (1D) lumped sensor.

5. The touch sensing circuit of claim 4, wherein the 1D lumped sensor is a slider.

6. The touch sensing circuit of claim 4, wherein the controller is further configured to determine a location of a single touch input on the 2D surface based on which 1D lumped sensors are touched.

7. The touch sensing circuit of claim 4, wherein the controller is further configured to scan individual sensor nodes in the 1D lumped sensors to resolve a location ambiguity on the 2D surface.

8. A method of touch sensing comprising:
   mapping, by a controller of a touch sense circuit, sensor channels to sensor nodes, the sensor nodes forming a plurality of interleaved lumped sensors, where at least two of the interleaved lumped sensors include a common sensor node;
   scanning, during a scan period, the interleaved lumped sensors to detect one or more touch inputs; and responsive to detecting one or more touch inputs, determining a location of at least one touch input.

9. The method of claim 8, further comprising:
scanning, by the controller, a sensor node in an interleaved lumped sensor to resolve a detection ambiguity between two or more interleaved lumped sensors that are touched.

10. The method of claim 8, further comprising:
comparing, by the controller, changes in capacitance measured on two or more interleaved lumped sensors to resolve a detection ambiguity between the two or more interleaved lumped sensors.

11. The method of claim 8, wherein the controller is further configured to map the interleaved lumped sensors to rows and columns of a two-dimensional (2D) surface to thereby form a one-dimensional (1D) lumped sensor.

12. The method of claim 11, wherein the 1D lumped sensor is a slider.

13. The method of claim 11, further comprising:
determining, by the controller, a location of a single touch input on the 2D surface based on which 1D lumped sensors are touched.

14. The method of claim 11, further comprising:
scanning, by the controller, individual sensor nodes in the 1D lumped sensors to resolve a location ambiguity on the 2D surface.

15. A touch sensing system comprising:
sensor nodes;
a microcontroller;
a controller coupled to the microcontroller and the sensor nodes, the controller configured to:
map the sensor channels to the sensor nodes, the sensor nodes forming a plurality of interleaved lumped sensors, where at least two of the interleaved lumped sensors include a common sensor node;
scan, during a scan period, the interleaved lumped sensors to detect one or more touch inputs; responsive to detecting one or more touch inputs,
determining a location of at least one touch input; and
reporting the location to the microcontroller.

16. The touch sensing system of claim 15, wherein the controller is configured to:
scan a sensor node in an interleaved lumped sensor to resolve a detection ambiguity between two or more interleaved lumped sensors that are touched.

17. The touch sensing system of claim 15, wherein the controller is configured to:
compare changes in capacitance measured on two or more interleaved lumped sensors to resolve a detection ambiguity between the two or more interleaved lumped sensors.

18. The touch sensing system of claim 15, wherein the controller is further configured to map the interleaved lumped sensors to rows and columns of a two-dimensional (2D) surface to thereby form a one-dimensional (1D) lumped sensor.

19. The touch sensing system of claim 18, wherein the controller is configured to determine a location of a single touch input on the 2D surface based on which 1D lumped sensors are touched.

20. The touch sensing system of claim 18, wherein the controller is configured to scan individual sensor nodes in the 1D lumped sensors to resolve a location ambiguity on the 2D surface.

* * * * *

UNITED STATES PATENT AND TRADEMARK OFFICE
CERTIFICATE OF CORRECTION

PATENT NO. : 9,817,531 B2
APPLICATION NO. : 14/882170
DATED : November 14, 2017
INVENTOR(S) : Feargal Cleary

Page 1 of 1

It is certified that error appears in the above-identified patent and that said Letters Patent is hereby corrected as shown below:

In the Specification

Column 9, Line 38, replace "$Y_b)$" with -- $Y_b)$ --.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*